United States Patent
Büchner et al.

(10) Patent No.: US 8,846,198 B2
(45) Date of Patent: Sep. 30, 2014

(54) AQUEOUS FORMULATIONS BASED ON CRYSTALLINE OR SEMICRYSTALLINE POLYURETHANE POLYMERS

(75) Inventors: Jörg Büchner, Bergisch Gladbach (DE); Dirk Achten, Leverkusen (DE); Harald Kraus, Leverkusen (DE); Wolfgang Arndt, Dormagen (DE)

(73) Assignee: Bayer MaterialScience AG, Monheim (DE)

( * ) Notice: Subject to any disclaimer, the term of this patent is extended or adjusted under 35 U.S.C. 154(b) by 41 days.

(21) Appl. No.: 13/503,886

(22) PCT Filed: Oct. 25, 2010

(86) PCT No.: PCT/EP2010/066014
§ 371 (c)(1),
(2), (4) Date: May 22, 2012

(87) PCT Pub. No.: WO2011/051199
PCT Pub. Date: May 5, 2011

(65) Prior Publication Data
US 2012/0225302 A1   Sep. 6, 2012

(30) Foreign Application Priority Data

Oct. 29, 2009   (EP) .................... 09013612

(51) Int. Cl.
| | |
|---|---|
| *B32B 27/40* | (2006.01) |
| *B32B 7/12* | (2006.01) |
| *B32B 37/12* | (2006.01) |
| *C08L 75/04* | (2006.01) |
| *C09J 175/04* | (2006.01) |

(52) U.S. Cl.
USPC ............... 428/355 N; 428/423.3; 428/423.4; 428/423.5; 428/424.6; 428/425.1; 156/331.7; 524/589

(58) Field of Classification Search
USPC ......... 428/355 R, 355 N, 423.3, 423.4, 423.5, 428/424.6, 425.1; 156/331.7; 524/589
See application file for complete search history.

(56) References Cited

U.S. PATENT DOCUMENTS

| | | |
|---|---|---|
| 5,252,696 A | 10/1993 | Laas et al. |
| 6,426,414 B1 | 7/2002 | Laas et al. |
| 2008/0114093 A1* | 5/2008 | Lagneaux et al. ............ 523/351 |
| 2008/0171208 A1* | 7/2008 | Buchner et al. ............ 428/423.1 |

FOREIGN PATENT DOCUMENTS

| | | |
|---|---|---|
| DE | 102006058527 A1 | 6/2008 |
| EP | 0 540 985 A1 | 5/1993 |
| EP | 0 959 087 A1 | 11/1999 |

OTHER PUBLICATIONS

Methoden der organischen Chemie (Houben-Weyl, supplementary and follow-up volumes to the 4th edition, vol. E20, H. Bartl and J. Falbe, Stuttgart, New York, Thieme 1987, p. 1671-1682.
International Search Report for PCT/EP2010/066014 mailed Sep. 5, 2011.

* cited by examiner

*Primary Examiner* — Thao T. Tran
(74) *Attorney, Agent, or Firm* — Drinker Biddle & Reath LLP

(57) ABSTRACT

The present invention relates to aqueous compositions based on crystalline or semicrystalline polyurethane polymers, processes for the preparation thereof and adhesive systems comprising these aqueous compositions and the use thereof.

16 Claims, No Drawings

US 8,846,198 B2

AQUEOUS FORMULATIONS BASED ON CRYSTALLINE OR SEMICRYSTALLINE POLYURETHANE POLYMERS

CROSS-REFERENCE TO RELATED APPLICATIONS

This application is a national stage application (under 35 U.S.C. §371) of PCT/EP2010/066014, filed Oct. 25, 2010, which claims benefit of European application 09013612.8, filed Oct. 29, 2009, both of which are incorporated herein by reference in their entirety for all their useful purposes.

BACKGROUND

The present invention relates to aqueous compositions based on crystalline or semicrystalline polyurethane polymers, processes for the preparation thereof and adhesive systems comprising these aqueous compositions and the use thereof.

The use of aqueous dispersion adhesives has increased greatly in importance in recent years because of their good environmental compatibility. In particular, dispersion adhesives based on polyurethane polymers with crystalline or partly crystalline polyester segments have been able to replace solvent-containing adhesives in a number of industrial uses.

As a rule, aqueous dispersion polymers are processed in this context co-using liquid, hydrophilically modified, predominantly aliphatic polyisocyanates (so-called 2-component processing). However, during the 2-component processing the formation of labile carbamic acid derivatives which dissociate into the amine on which they are based and carbon dioxide occurs between the polyisocyanate and the aqueous phase of the dispersion. The amine released in turn reacts spontaneously with free isocyanate to give urea. The isocyanate required for the crosslinking of the polymer chains of the dispersion polymer is slowly consumed in this manner by the reaction with water. The pot lives, that is to say the maximum processing time of the 2-component adhesive dispersions of a polyurethane dispersion and a hydrophilically modified, predominantly aliphatic isocyanate, depend inter alia on the pH of the formulation and are typically 1-12 hours.

If the 2-component dispersion adhesive is processed after the pot life has elapsed, the amount of isocyanate groups is not sufficient to crosslink the polyurethane polymer completely. The result is then an adhesive bond which does not achieve the required quality with respect to heat resistance.

The reactivity of the polyisocyanate in the aqueous adhesive dispersion should thus be as low as possible in order to ensure a long processing time.

At the same time, however, there is the desire for the highest possible reactivity, i.e. a rapid crosslinking reaction in the adhesive layer after the joining process. This is of interest in particular if the adhesive bond is to be further processed as soon as possible after the joining. It is moreover advantageous to be able to carry out quality testing of the adhesive bonds as soon as possible after the joining process, since in this manner errors in the production process can be discovered faster and the reject rates in industrial production processes can thus be reduced significantly.

In the case of the commercially available 2-component adhesive dispersions of polyurethane dispersions and hydrophilically modified, predominantly aliphatic polyisocyanate, the producer of the adhesive bond must as a rule wait 2-3 days before he can carry out such quality testing.

One possibility for accelerating the crosslinking reaction in the adhesive layer lies in storage of the adhesive bond at elevated temperature (thermal curing). However, this is associated with high costs for generation of heat.

The present invention was therefore based on the object of providing adhesive systems based on aqueous formulations, which allow as long as possible a pot life to be achieved and at the same time already lead to adhesive bonds of high strength 24 hours after production of the adhesive bond and storage of the substrates glued in this way.

The object is achieved by the subject matter of the invention.

DESCRIPTION OF EMBODIMENTS

The present invention provides aqueous compositions comprising
(a) at least one crystalline or semicrystalline polyurethane polymer,
(b) at least one polyisocyanate with aliphatically bonded isocyanate groups which is liquid at a temperature in the range of from 20° C. to 25° C.,
(c) at least one or more compounds of elements of sub-group 5 and 6 of the periodic table in which the particular element has an oxidation level of at least +4,
(d) optionally further auxiliary substances and additives.

Preferably, the amounts of (a)+(b) are from 20 to 99.9999 parts by wt., the amount of (c) is from 0.0001 to 5 parts by wt. and the amount of (d) is from 0 to 75 parts by wt., with the proviso that the sum of the parts by wt. of the individual components (a) to (d) is 100.

Particularly preferably, the amounts of (a)+(b) are from 40 to 99.999 parts by wt., the amount of (c) is from 0.001 to 5 parts by wt. and the amount of (d) is from 0 to 59 parts by wt., with the proviso that the sum of the parts by wt. of the individual components (a) to (d) is 100.

Preferably, the sum of the amounts of (a)+(b) comprises 70 to 99.5 parts by wt. of (a) and 0.5 to 30 parts by wt. of (b), particularly preferably 80 to 98 parts by wt. of (a) and 2 to 20 parts by wt. of (b).

Preferably, the aqueous formulations according to the invention are two-component systems.

Two-component systems in the context of the present invention are understood as meaning systems in which components a) and b) must be stored in separate vessels because of their reactivity. The two components are mixed only shortly before application and then in general react without additional activation.

Preferably, the crystalline or semicrystalline polyurethane polymer a) has a melting point in the range between 42° C. and 100° C., particularly preferably in the range between 42° C. and 60° C., very particularly preferably in the range between 45° C. and 52° C.

Preferably, the crystalline or semicrystalline polyurethane polymer a) has a glass transition temperature in the range between −100° C. and −10° C., particularly preferably in the range between −60° C. and −40° C., measured by DSC in accordance with DIN 65467 with a heating up rate of 10 K/min.

Preferably, the crystalline or semicrystalline polyurethane polymer a) has a weight-average molecular weight Mw in the range between 20,000 and 250,000 g/mol, particularly preferably between 30,000 and 220,000 g/mol, very particularly preferably between 50,000 and 200,000 g/mol.

The weight-average molecular weight is determined by means of gel permeation chromatography (GPC/SEC) with dimethylacetamide as the mobile phase.

In this connection, semicrystalline or crystalline means that in the DSC measurement in accordance with DIN 65467 at a heating up rate of 20 K/min, the polyurethane polymer has a melting peak which corresponds to a melt enthalpy in the range of from 106 J/g to 45 J/g, preferably in the range of from 101 J/g to 54 J/g and very particularly preferably in the range of from 99 J/g to 63 J/g.

It has been found, surprisingly, that compounds of elements of sub-group 5 and 6 of the periodic table in which the particular element has an oxidation level of at least +4 only have the effect of adequate acceleration of the crosslinking reaction of the compounds a) and the compounds b) if the compounds a) are built up from crystalline or partly crystalline polymer chains.

The crystalline or partly crystalline polyurethane polymers a) therefore contain as builder components A) one or more difunctional or more than difunctional polyester polyols with a number-average molecular weight of from 400 to 5,000 daltons, preferably from 1,000 to 3,000 daltons, particularly preferably from 1,500 to 2,500 daltons, B) optionally one or more difunctional or more than difunctional polyol component(s) with a number-average molecular weight of from 62 to 399 daltons, C) at least one component which contains sulfonate and/or carboxylate groups and which furthermore has at least one isocyanate-reactive hydroxyl and/or amino group and thus leads to terminal or lateral sulfonate or, respectively, carboxylate structural units, D) one or more di- or polyisocyanate component(s) and E) optionally one or more diamino and/or monoamino compounds F) optionally other isocyanate-reactive compounds.

Preferred di- or more than difunctional polyester polyols A) are based on linear dicarboxylic acids and/or derivatives thereof, such as anhydrides, esters or acid chlorides, and aliphatic or cycloaliphatic, linear or branched polyols. Dicarboxylic acids chosen from the group consisting of adipic acid, succinic acid, sebacic acid and dodecandioic acid are particularly preferred, and adipic acid is very particularly preferred as component A). These are employed in amounts of at least 80 mol %, preferably from 85 to 100 mol %, particularly preferably from 90 to 100 mol %, based on the total amount of all the carboxylic acids.

Other aliphatic, cycloaliphatic or aromatic dicarboxylic acids can optionally be co-used. Examples of such dicarboxylic acids are glutaric acid, azelaic acid, 1,4-, 1,3- or 1,2-cyclohexanedicarboxylic acid, terephthalic acid or isophthalic acid. These are employed in amounts of up to a maximum of 20 mol %, preferably from 0 to 15 mol %, particularly preferably from 0 to 10 mol %, based on the total amount of all the carboxylic acids.

Preferred polyol components for the polyesters A) are chosen from the group consisting of monoethylene glycol, propane-1,3-diol, butane-1,4-diol, pentane-1,5-diol, hexane-1,6-diol and neopentyl glycol, butane-1,4-diol and hexane-1,6-diol are particularly preferred as the polyol component, and butane-1,4-diol is very particularly preferred. These are employed in amounts of at least 80 mol %, preferably from 90 to 100 mol %, based on the total amount of all the polyols.

Other aliphatic or cycloaliphatic, linear or branched polyols can optionally be co-used. Examples of such polyols are diethylene glycol, hydroxypivalic acid neopentyl glycol, cyclohexanedimethanol, pentane-1,5-diol, pentane-1,2-diol, nonane-1,9-diol, trimethylolpropane, glycerol or pentaerythritol. These are employed in amounts of a maximum of 20 mol %, preferably from 0 to 10 mol %, based on the total amount of all the polyols.

Mixtures of two or more such polyesters A) are also possible.

Polyesters A) based on adipic acid and 1,4-butanediol or adipic acid and 1,6-hexanediol or adipic acid and a mixture of 1,6-hexanediol and neopentyl glycol are preferably employed.

Difunctional or more than difunctional polyol components with a number-average molecular weight of from 62 to 399 daltons, such as, for example, polyethers, polyesters, polycarbonates, polylactones or polyamides, are suitable as builder component B).

Further suitable components B) are the aliphatic or cycloaliphatic, linear or branched polyols mentioned under A). Preferred components B) are monoethylene glycol, butane-1,4-diol or hexane-1,6-diol. Butane-1,4-diol is particularly preferred.

Suitable components C) containing sulfonate or carboxylate groups are e.g. diamino compounds or dihydroxy compounds which additionally carry sulfonate and/or carboxylate groups, such as, for example, the sodium, lithium, potassium and tert-amine salts of N-(2-aminoethyl)-2-aminoethanesulfonic acid, of N-(3-aminopropyl)-2-aminoethanesulfonic acid, of N-(3-aminopropyl)-3-aminopropanesulfonic acid, of N-(2-aminoethyl)-3-aminopropanesulfonic acid, of the analogous carboxylic acids, of dimethylolpropionic acid, of dimethylolbutyric acid or of the reaction products in the sense of a Michael addition of 1 mol of diamine, such as e.g. 1,2-ethanediamine or isophoronediamine, with 2 mol of acrylic acid or maleic acid.

Preferred components C) are N-(2-aminoethyl)-2-aminoethanesulfonate or dimethylolpropionate.

The acids are preferably employed directly in their salt form as sulfonate or carboxylate. However, it is also possible for a proportion or all of the neutralizing agent needed for the salt formation to be first added during or after the preparation of the polyurethanes.

tert-Amines which are particularly suitable and preferred for the salt formation are e.g. triethylamine, dimethylcyclohexylamine and ethyldiisopropylamine.

Other amines can also be employed for the salt formation, such as e.g. ammonia, diethanolamine, triethanolamine, dimethylethanolamine, methyldiethanolamine, aminomethylpropanol and also mixtures of the amines mentioned and also of other amines. These amines are appropriately added only after the isocyanate groups have largely reacted.

It is also possible to employ other neutralizing agents for neutralization purposes, such as e.g. sodium, potassium, lithium or calcium hydroxide.

Organic compounds which have at least two free isocyanate groups per molecule are preferably suitable as builder components D). Diisocyanates Y(NCO)$_2$, wherein Y represents a divalent aliphatic hydrocarbon radical having 4 to 12 carbon atoms, a divalent cycloaliphatic hydrocarbon radical having 6 to 15 carbon atoms, a divalent aromatic hydrocarbon radical having 6 to 15 carbon atoms or a divalent araliphatic hydrocarbon radical having 7 to 15 carbon atoms, are preferably employed. The diisocyanates are particularly preferably chosen from the group consisting of tetramethylene-diisocyanate, methylpentamethylene-diisocyanate, hexamethylene-diisocyanate, do decamethylene-diisocyanate, 1,4-diisocyanatocyclohexane, 1-isocyanato-3,3,5-trimethyl-5-isocyanatomethylcyclohexane, 4,4'-diisocyanatodicyclohexylmethane, 4,4'-diisocyanato-2,2-dicyclohexylpropane, 1,4-diisocyanatobenzene, 2,4- diisocyanatotoluene, 2,6-diisocyanatotoluene, 4,4'-diisocyanatodiphenylmethane, 2,2'- and 2,4'-diisocyanato diphenylmethane, tetramethylxylyene-diisocyanate, p-xylylene-diisocyanate and p-isopropylidene-diisocyanate and mixtures consisting of these compounds.

It is of course also possible for a proportion of the more highly functional polyisocyanates known per se in polyurethane chemistry or also modified polyisocyanates known per se, for example containing carbodiimide groups, allophanate groups, isocyanurate groups, urethane groups and/or biuret groups, to be co-used.

Diisocyanates D) are very particularly preferably chosen from the group consisting of hexamethylene-diisocyanate, 1,4-diisocyanatocyclohexane, 1-isocyanato-3,3,5-trimethyl-5-isocyanatomethylcyclohexane, 4,4'-diisocyanatodicyclohexylmethane and 4,4'-diisocyanato-2,2-dicyclohexylpropane and mixtures consisting of these compounds.

2,4-Diisocyanatotoluene and 2,6-diisocyanatotoluene and mixtures thereof are likewise still further preferred as component D).

Still further preferred builder components D) are mixtures of hexamethylene-diisocyanate and 1-isocyanato-3,3,5-trimethyl-5-isocyanatomethylcyclohexane.

Primary and/or secondary monoamino compounds and/or primary and/or secondary diamino compounds are possible as builder component E).

Aliphatic and/or alicyclic primary and/or secondary monoamines, such as ethylamine, diethylamine, the isomeric propyl- and butylamines, higher linear aliphatic monoamines and cycloaliphatic monoamines, such as cyclohexylamine, are preferred as component E). Further examples of component E) are amino alcohols, i.e. compounds which contain amino and hydroxyl groups in one molecule, such as e.g. ethanolamine, N-methylethanolamine, diethanolamine and 2-propanolamine. Mixtures of several monoamino compounds can of course also be employed.

Particularly preferred monoamino compounds are chosen from the group consisting of diethylamine, ethanolamine and diethanolamine. Diethanolamine is very particularly preferred.

Particularly preferred diamino compounds are chosen from the group consisting of 1,2-ethanediamine, 1,6-hexamethylenediamine, 1-amino-3,3,5-trimethyl-5-aminomethylcyclohexane (isophoronediamine), piperazine, 1,4-diaminocyclohexane and bis-(4-aminocyclohexyl)-methane. Diamino compounds which are furthermore particularly preferred are amino compounds such as, for example, 1,3-diamino-2-propanol, N-(2-hydroxyethyl)-ethylenediamine and N,N-bis(2-hydroxyethyl)ethylenediamine. Adipic acid dihydrazide, hydrazine and hydrazine hydrate are furthermore possible as component E). Polyamines, such as diethylenetriamine, can also be employed as component E) instead of a diamino compound.

Preferred components F) which are optionally to be co-used are e.g. aliphatic, cycloaliphatic or aromatic monoalcohols having 2 to 22 C atoms, such as ethanol, butanol, hexanol, cyclohexanol, isobutanol, benzyl alcohol, stearyl alcohol and 2-ethylethanol; mono- or difunctional polyethers which are based on ethylene oxide polymers or ethylene oxide/propylene oxide copolymers started on alcohols or amines and have a hydrophilizing action, such as e.g. Polyether LB 25 (Bayer MaterialScience AG; Germany) or MPEG 750: methoxypolyethylene glycol, molecular weight 750 g/mol (e.g. Pluriol® 750, BASF AG, Germany); blocking agents which are usual for isocyanate groups and can be split off again at elevated temperature, such as e.g. butanone oxime, dimethylpyrazole, caprolactam, malonates, triazole, dimethyltriazole, tert-butylbenzylamine and cyclopentanone carboxyethyl ester; and unsaturated compounds containing groups accessible for polymerization reactions, such as e.g. hydroxyethyl acrylate, hydroxyethyl methacrylate, hydroxybutyl acrylate, hydroxybutyl methacrylate, hydroxypropyl acrylate, hydroxypropyl methacrylate, pentaerythritol trisacrylate and hydroxy-functional reaction products of monoepoxides, bisepoxides and/or polyepoxides with acrylic acid or methacrylic acid.

The polyurethane according to the invention can contain components F) in amounts of from 0 to 20, preferably from 0 to 10 wt. %.

The content of ionic groups is between 2 and 600 mmol per kg of solid, preferably between 10 and 400 mmol, particularly preferably between 40 and 300 mmol per kg of solid.

The present invention furthermore provides a process for the preparation of the aqueous polyurethane or polyurethane-urea dispersion according to the invention, characterized in that components A), optionally B), C), D) and optionally F) are reacted in a one- or multi-stage reaction to give an isocyanate-functional prepolymer, which is subsequently reacted with optionally component E), C) and optionally F) in a one- or two-stage reaction and is then dispersed in or with water, it being possible for a proportion or all of the optionally co-used solvent to be removed by distillation during or after the dispersing.

The preparation of the aqueous polyurethane or polyurethane-urea dispersions according to the invention can be carried out in one or more stages in a homogenous or, in the case of a multi-stage reaction, partially in a disperse phase. After the polyaddition has been completely or partially carried out, a dispersing, emulsifying or dissolving step is carried out. Thereafter, a further polyaddition or modification is optionally carried out in the disperse phase. All the processes known from the prior art can be used for the preparation, such as emulsifier-shearing force, acetone, prepolymer mixing, melt emulsification, ketimine and solid spontaneous dispersing processes or derivatives thereof. A summary of these methods is to be found in Methoden der organischen Chemie (Houben-Weyl, supplementary and follow-up volumes to the 4th edition, volume E20, H. Bartl and J. Falbe, Stuttgart, N.Y., Thieme 1987, p. 1671-1682). The melt emulsification, prepolymer mixing and the acetone process are preferred. The acetone process is particularly preferred.

It is possible in principle to weigh out all the hydroxy-functional components, then to add all the isocyanate-functional components and to react the mixture to give an isocyanate-functional polyurethane, which is then reacted with the amino-functional components. A reverse preparation, initial introduction of the isocyanate component into the reaction vessel, addition of the hydroxy-functional components, reaction to give the polyurethane and then reaction with the amino-functional components to give the end product, is also possible.

Conventionally, all or a portion of the hydroxy-functional components A), optionally B), optionally C) and optionally F) for the preparation of a polyurethane prepolymer are initially introduced into the reactor and the mixture is optionally diluted with a solvent which is miscible with water but inert towards isocyanate groups and then homogenized. Component D) is then metered in at room temperature to 120° C. and an isocyanate-functional polyurethane is prepared. This reaction can be carried out as a one-stage reaction and also as a multi-stage reaction. A multi-stage reaction can be carried out e.g. in a manner in which a component A) is initially introduced into the reaction vessel and, after reaction with the isocyanate-functional component D), a second component B) is added, which can then react with a portion of the isocyanate groups still present.

Suitable solvents are e.g. acetone, methyl isobutyl ketone, butanone, tetrahydrofuran, dioxane, acetonitrile, dipropylene glycol dimethyl ether and 1-methyl-2-pyrrolidone, which can be added not only at the start of the preparation, but optionally in portions also later. Acetone and butanone are preferred. It is possible to carry out the reaction under normal pressure or increased pressure.

For the preparation of the prepolymer, the amounts of the hydroxy- and optionally amino-functional components employed are such that an isocyanate characteristic number of from 1.05 to 2.5, preferably from 1.15 to 1.85 results.

The further reaction, the so-called chain lengthening, of the isocyanate-functional prepolymer with further hydroxy- and/or amino-functional, preferably only with amino-functional components E), and optionally C) and optionally F) is carried out in a manner such that a degree of conversion of from 25 to 150, preferably from 40 to 85% of the hydroxyl and/or amino groups, based on 100% of isocyanate groups, is chosen. The process is carried out by adding component C) at the start and/or at the end.

At degrees of conversion of more than 100%, which are possible but less preferred, it is appropriate first to react all the components which are monofunctional in the sense of the isocyanate addition reaction with the prepolymer and then to employ the di- or more than difunctional chain-lengthening components in order to obtain an as far as possible complete incorporation of all the chain-lengthening molecules.

The degree of conversion is conventionally monitored by monitoring the NCO content of the reaction mixture. For this, either spectroscopic measurements, e.g. infrared or near infrared spectra, determinations of the refractive index or chemical analyses, such as titrations of samples taken, can be carried out.

To accelerate the isocyanate addition reaction, conventional catalysts such as are known to the person skilled in the art for acceleration of the NCO—OH reaction can be employed. Examples are triethylamine, 1,4-diazabicyclo-[2,2,2]-octane, dibutyltin oxide, tin dioctoate or dibutyltin dilaurate, tin bis-(2-ethylhexanoate) or other organometallic compounds.

The chain lengthening of the isocyanate-functional prepolymers with component C) and optionally E) and optionally F) can be carried out before the dispersing, during the dispersing or after the dispersing. The chain lengthening is preferably carried out before the dispersing. If component C) is employed as the chain-lengthening component, chain lengthening with this component before the dispersing step is necessary.

The chain lengthening is conventionally carried out at temperatures of from 10 to 100° C., preferably from 25 to 60° C.

The term chain lengthening in the context of the present invention also includes the reactions optionally of monofunctional components E) or also F) which function as chain terminators as a result of their monofunctionality and therefore lead not to an increase but to a limitation of the molecular weight.

The components of the chain lengthening can be added to the reaction mixture in a form diluted with organic solvents and/or with water. The addition can be carried out in succession in any desired sequence or simultaneously by addition of a mixture.

For the purpose of preparation of the polyurethane dispersion, the prepolymer is either introduced into the dispersing water, optionally under high shearing forces, such as e.g. vigorous stirring, or, conversely, the dispersing water is stirred into the prepolymer. The chain lengthening can then be carried out, if this has not yet taken place in the homogeneous phase.

The organic solvent optionally employed, for example acetone, is distilled off during and/or after the dispersing.

A preferred preparation process is described in the following:

The OH-functional components A), optionally B), optionally C) and optionally F) and optionally solvent are initially introduced into the reaction vessel and heated up to 20 to 100° C. Component D) is metered in as rapidly as possible, while stirring. Utilizing the exothermicity, the reaction mixture is stirred at 40 to 150° C. until the isocyanate content reaches the theoretical value or is slightly below this. Catalyst can optionally be added here. The mixture is subsequently diluted to solids contents of from 25 to 95, preferably from 30 to 80 wt. % by addition of solvent and the chain lengthening is then carried out by addition of the amino-functional components, diluted with water and/or solvent, E), optionally C), and/or optionally F) at 30 to 120° C. After a reaction time of 2 to 60 minutes, dispersing is carried out by addition of distilled water or by transferring into distilled water which has been initially introduced into the dispersing vessel, and some or all of the solvent employed is distilled off during or after the dispersing step. The process is carried out by adding component C) at the start and/or at the end.

The conversion of the sulfonic or carboxylic acids into sulfonates or carboxylates can be carried out before, during or after the chain lengthening. It can moreover be carried out before or during the dispersing.

The polyisocyanate component (b) is any desired organic polyisocyanates which have aliphatically bonded free isocyanate groups and are liquid at a temperature in the range of from 20° C. to 25° C. or are diluted with solvents for this purpose. The polyisocyanate component (b) has a viscosity at 23° C. of from 10 to 15,000, preferably 10 to 5,000 mPa·s. The viscosity is determined with a VT-500 rotary viscometer from Haake in accordance with DIN 53019.

The polyisocyanate component (b) is particularly preferably polyisocyanates or polyisocyanate mixtures with exclusively aliphatically bonded isocyanate groups having an (average) NCO functionality of between 2.0 and 5.0 and a viscosity at 23° C. of from 10 to 2,000 mPa·s.

Polyisocyanates chosen from the group consisting of isophorone-diisocyanate (Desmodur I), hexamethylene-diisocyanate (Desmodur H), bis-(4-isocyanatocyclohexyl)-methane (Desmodur W, ω,ω'-diisocyanato-1,3-dimethylcyclohexane (H6XDI), triisocyanatononane and XDI (1,3-bis(isocyanatomethyl)benzene) are particularly preferred as component b).

Component b) can also be employed as a mixture with aromatic polyisocyanates, such as toluene-2,4-diisocyanate.

The diisocyanates mentioned can optionally be used as such, but as a rule derivatives of the diisocyanates are used. Suitable derivatives are polyisocyanates containing biuret, isocyanurate, uretdione, urethane, iminooxadiazinedione, oxadiazinetrione, carbodiimide, acylurea and allophanate groups.

The polyisocyanate component (b) can optionally be hydrophilically modified. Water-soluble or -dispersible polyisocyanates are obtainable e.g. by modification with carboxylate, sulfonate and/or polyethylene oxide groups and/or polyethylene oxide/polypropylene oxide groups.

Hydrophilization of the polyisocyanates is possible e.g. by reaction with deficient amounts of monofunctional hydrophilic polyether alcohols. The preparation of such hydrophilized polyisocyanates is described, for example, in EP-A 0 540 985, p. 3, 1.55-p. 41.5. The polyisocyanates described in EP-A-0 959 087, p. 31.39-51 which contain allophanate groups and are prepared by reaction of low-monomer polyisocyanates with polyethylene oxide polyether alcohols under allophanation conditions are also particularly suitable. External hydrophilization by addition of emulsifiers is likewise possible.

The NCO content of the polyisocyanate component (b) used, e.g. in the case of so-called polyether allophanates (hydrophilization by means of a polyether) can range from 5-25 wt. %. In the case of a hydrophilization with sulfonic acid groups, NCO contents of 4-26 wt. % can be achieved, where these figures are to be understood as being only by way of example.

A portion, e.g. up to one third of the isocyanate groups present in the isocyanate components employed can also be blocked by components which are reactive towards isocyanates. In this case, reaction of the blocked isocyanate component with further polyol can occur in a later step, in order to bring about a further crosslinking.

Suitable blocking agents for these polyisocyanates are, for example, monofunctional alcohols, such as methanol, ethanol, butanol, hexanol, cyclohexanol or benzyl alcohol, oximes, such as acetoxime, methyl ethyl ketoxime or cyclohexanone oxime, lactams, such as ε-caprolactam, phenols, amines, such as diisopropylamine or dibutylamine, dimethylpyrazole or triazole, and malonic acid dimethyl ester, malonic acid diethyl ester or malonic acid dibutyl ester.

It has been found, surprisingly, that compounds of elements of sub-group 5 and 6 of the periodic table in which the particular element has an oxidation level of at least +4 accelerate the reaction between the compounds a) and b) such that, while retaining the long pot life of >8 hours, the crosslinking reaction between the compounds a) and b) is already concluded after storage at room temperature for 24 hours.

Compounds of elements chosen from the group consisting of vanadium, tantalum, molybdenum and tungsten are preferably employed as compounds (c).

Compounds chosen from the group consisting of molybdic acid, lithium molybdate, sodium molybdate, potassium molybdate, rubidium molybdate, caesium molybdate, tetramethylammonium molybdate, tetraethylammonium molybdate, molybdenyl acetylacetonate, molybdenum dioxide tetramethylheptadionate, sodium tungstate, lithium orthovanadate, lithium metavanadate and its modifications, sodium orthovanadate, sodium metavanadate and ammonium heptamolybdate are particularly preferably employed as compounds (c).

Compounds c) chosen from the group consisting of lithium molybdate, sodium molybdate, potassium molybdate, rubidium molybdate, caesium molybdate and other molybdate salts of mono-, di- or trivalent cations and molybdate salts which have an organic cation, such as e.g. ammonium, tetramethylammonium, tetraethylphosphonium etc., are very particularly preferred.

Compounds c) chosen from the group consisting of lithium molybdate, sodium molybdate and molybdic acid are still more preferred.

The amounts of catalyst to be employed for the compounds c) are very low. Generally, an amount of active compound of from 1 to 50,000 ppm can be employed, and a range of from 1 to 30,000 ppm, based on all the components of the aqueous composition, is preferred. The activity of the catalyst is independent of the nature of its addition. It can thus be added directly into the water added. Alternatively, it can also be incorporated into components (a) and/or (b).

The dispersions preferably have a solids content of from 10 to 60 wt. %, particularly preferably from 25 to 60 wt. % and very particularly preferably 35 to 55 wt. %.

Depending on the molecular weight of component (a) and its content of anionic groups or of free acid groups, in particular sulfonate and/or carboxyl groups, the aqueous systems comprising the polymers are true dispersions, colloidally disperse or molecularly disperse dispersions, but in general so-called "partial dispersions", i.e. aqueous systems which are partly molecularly disperse and partly colloidally disperse.

Preferably, the aqueous formulation according to the invention has a viscosity in the range between 10 mPas and 20,000 mPas, particularly preferably in the range between 1,000 mPas and 5,000 mPas, very particularly preferably in the range between 1,500 mPas and 2,500 mPas.

Preferably, the aqueous formulation according to the invention has a pH in the range between 5 and 12, particularly preferably in the range between 6 and 11, very particularly preferably in the range between 6 and 9.

The ratio of isocyanate groups to hydroxyl groups (NCO—OH ratio) of component b) to component a) can span a wide range. The isocyanate groups are preferably added in excess.

The invention also provides a process for the preparation of the aqueous formulations according to the invention, wherein the sequence of the addition of the components of the adhesive system and of the auxiliary substances (a) to (d) can be varied as desired.

The present invention also provides adhesive systems comprising an aqueous composition according to the invention.

The adhesive systems according to the invention can be employed by themselves or with the binders, auxiliary substances and additives known in coatings and adhesives technology, in particular emulsifiers or light stabilizers, such as UV absorbers or sterically hindered amines (HALS), furthermore antioxidants, fillers or auxiliary substances, e.g. antisettling agents, defoaming and/or wetting agents, flow agents, reactive diluents, plasticizers, catalysts, auxiliary solvents and/or thickeners and additives, such as, for example, pigments, dyestuffs or matting agents. Tackifying resins ("tackifiers") can also be added. Tackifying resins are to be understood as meaning all natural or synthetic resins or polymers which as additives increase the tack, that is to say the property of adhering firmly to surfaces after briefly pressing on gently. In order to achieve this, adhesive resins must have, inter alia, an adequate compatibility with the polymers. Tackifiers themselves do not need to have tack. Tackifiers which are widely employed are, inter alia, terpene oligomers, aliphatic petrochemical resins and colophony resins.

The additives can be added to the adhesive systems according to the invention directly before processing. However, it is also possible to add at least a portion of the additives before, during or after the dispersing of the binder.

The adhesive systems according to the invention are suitable for gluing any desired substrates, such as e.g. paper, cardboard, wood, textiles, metal, leather or mineral materials. The adhesive compositions according to the invention are moreover suitable for gluing rubber materials, such as e.g. natural and synthetic rubbers, various plastics, such as polyurethanes, polyvinyl acetate or polyvinyl chloride, and thermoplastic polymers, such as polycarbonate, polyamide, acrylic/butadiene/styrene and mixtures thereof.

The adhesive systems according to the invention are particularly preferably suitable for gluing synthetic or natural materials such as are employed e.g. in the production of shoes, in particular sports shoes. Such materials are e.g. leather, EVA soles (primed and non-primed), rubber, polyurethanes, polyamides and polyether-polyamides (Pebax).

The invention is illustrated in the following with the aid of examples.

EXAMPLES

Dispercoll® U 54, polyurethane dispersion from Bayer MaterialScience AG, 51368 Leverkusen; solids content approx. 50 wt. %; isocyanate-reactive polymer of linear polyurethane chains based on an adipic acid/butanediol polyester with HDI/IPDI as the isocyanate component. The glass transition temperature of the dispersion polymer is −50° C. Measurement is by means of DSC. According to DSC measurement, the decrystallization temperature is approx. 48° C.

Dispercoll® U 42, polyurethane dispersion from Bayer MaterialScience AG, 51368 Leverkusen; solids content approx. 50 wt. %; isocyanate-reactive polymer of linear polyurethane chains based on a phthalic acid/hexanediol polyester with HDI as the isocyanate component. The glass transition temperature of the dispersion polymer is approx. −10° C. Measurement is by means of DSC.

Description of the hydrophilically modified polyisocyanates:

Desmodur DN, hydrophilically modified crosslinker isocyanate based on HDI trimer. Isocyanate content approx. 20%

Desmodur D XP 2725, hydrophilically modified crosslinker isocyanate based on HDI trimer/TDI trimer, active compound content=85%, isocyanate content approx. 15.5%

Tanemul FD-liquid from Tanatex Chemicals B.V.: solution of 13-17 wt. % of stearyl alcohol polyglycol ether in water, CAS No.: 68439-49-6

Aqueous Formulations:
1. 100 parts by wt. of Dispercoll U 54
   5 parts by wt. of Desmodur DN
2. 100 parts by wt. of Dispercoll U 54
   3 parts by wt. of 10% lithium molybdate in Tanemul FD-liquid
   5 parts by wt. of Desmodur DN
3. 100 parts by wt. of Dispercoll U 54
   5 parts by wt. of Desmodur D XP 2725
4. 100 parts by wt. of Dispercoll U 54
   3 parts by wt. of 10% lithium molybdate in Tanemul FD-liquid
   5 parts by wt. of Desmodur D XP 2725
5. 100 parts by wt. of Dispercoll U 42
   3 parts by wt. of 10% lithium molybdate in Tanemul FD-liquid
   5 parts by wt. of Desmodur DN
6. 100 parts by wt. of Dispercoll U 42
   3 parts by wt. of 10% lithium molybdate in Tanemul FD-liquid
   5 parts by wt. of Desmodur D XP 2725

Investigations

Test Means:
Beech wood test specimens 5 cm×14 cm
PVC films type Benelite (5 cm wide)

Sample Preparation:
The adhesive dispersion is spread on to the beech wood test specimens (area 5 cm×8 cm) by means of a 200 μm ribbed doctor blade. After 1 hour in a standard climate (23° C./50% relative atmospheric humidity), the adhesive layer dries off completely.

Thereafter, the PVC film is laid on the beech wood test specimen coated with adhesive and the specimen is laid in a heated membrane press. The composite is pressed under a pressure of 4 bar at a hot-plate temperature of 63° C. and 103° C. for 10 sec. During this time the temperature in the adhesive layer rises to max. 55° C. and, respectively, max. 77° C. The composite is then removed from the membrane press and stored in the standard climate for 24 hours.

Test for Heat Resistance

The composite is suspended in a heating cabinet temperature-controlled at 70° C. A weight of 2.5 kg is hung on the PVC film such that the film can peel off from the beech wood surface at an angle of 180°. After one hour, the test specimen is removed from the heating cabinet and the length which has peeled off is determined in mm.

Results:

The lengths peeled off [mm] are shown in the following table. In the case of values ≥80, the film peels off completely within the test duration of 60 min.

The values are the mean of in each case two individual measurements.

| No. | Max. temperature in the adhesive layer 55° C. | Max. temperature in the adhesive layer 77° C. | |
|---|---|---|---|
| 1 | >80 | >80 | comparison |
| 2 | <5 | <5 | according to the invention |
| 3 | >80 | >80 | comparison |
| 4 | <5 | <5 | according to the invention |
| 5 | >80 | 60 | comparison |
| 6 | >80 | 49 | comparison |

(all data in mm of peeled-off length)

The values show the very rapid crosslinking of the adhesive dispersion according to the invention with the partly crystalline polyurethane dispersion polymer. The crosslinking reaction has ended after 24 hours.

The comparison investigations with the dispersion adhesive without lithium molybdate (no. 1 and 3) still show no adequate crosslinking reaction after 24 hours.

The comparison with the amorphous polyurethane dispersion polymer (Comparison Example 5-6) demonstrates that the acceleration of the reaction between the hydrophilically modified polyisocyanates and the amorphous polyurethane polymer with the lithium molybdate does not lead to complete crosslinking of the polymer within 24 hours after the production of the adhesive bond.

The invention claimed is:

1. An aqueous composition comprising
   (a) at least one crystalline or semicrystalline polyurethane polymer,
   (b) at least one polyisocyanate with aliphatically bonded isocyanate groups which is liquid at a temperature in the range of from 20° C. to 25° C.,
   (c) at least one or more compounds of elements of subgroup 5 and 6 of the periodic table in which the particular element has an oxidation level of at least +4,
   (d) optionally further auxiliary substances and additives.

2. The aqueous composition according to claim 1, wherein the crystalline or semicrystalline polyurethane polymer has a melting point in the range of between 42° C. and 100° C.

3. The aqueous composition according to claim 1, wherein the crystalline or semicrystalline polyurethane polymer has a glass transition temperature in the range of between −100° C. and −10° C., measured by DSC in accordance with DIN 65467 at a heating up rate of 10 K/min.

4. The aqueous composition according to claim 1, wherein the crystalline or semicrystalline polyurethane polymer has a weight-average molecular weight Mw in the range of between 20,000 g/mol and 250,000 g/mol.

5. The aqueous composition according to claim 1, wherein the crystalline or semicrystalline polyurethane comprises as components
   A) one or more difunctional or more than difunctional polyester polyols with a number-average molecular weight of from 400 to 5,000 daltons,
   B) optionally one or more difunctional or more than difunctional polyol component(s) with a number-average molecular weight of from 62 to 399 daltons,
   C) at least one component which comprises sulfonate and/or carboxylate groups and which furthermore has at least one isocyanate-reactive hydroxyl and/or amino group and thus leads to terminal or lateral sulfonate or, respectively, carboxylate structural units,
   D) one or more di- or polyisocyanate component(s) and
   E) optionally one or more diamino and/or monoamino compounds
   F) optionally other isocyanate-reactive compounds.

6. The aqueous composition according to claim 1, wherein component b) is selected from the group consisting of isophorone-diisocyanate, hexamethylene-diisocyanate, bis-(4-isocyanatocyclohexyl)-methane, ω,ω'-diisocyanato-1,3-dimethylcyclohexane, triisocyanatononane and 1,3-bis(isocyanatomethyl)benzene.

7. The aqueous composition according to claim 1, wherein component c) comprises compounds of elements selected from the group consisting of vanadium, tantalum, molybdenum and tungsten.

8. The aqueous composition according to claim 7, wherein component c) comprises compounds selected from the group consisting of molybdic acid, lithium molybdate, sodium molybdate, potassium molybdate, rubidium molybdate, caesium molybdate, tetramethylammonium molybdate, tetraethylammonium molybdate, molybdenyl acetylacetonate, molybdenum dioxide tetramethylheptadionate, sodium tungstate, lithium orthovanadate, lithium metavanadate, sodium orthovanadate, sodium metavanadate and ammonium heptamolybdate.

9. The aqueous composition according to claim 8, wherein component c) comprises lithium molybdate.

10. The aqueous composition according to claim 1, wherein the pot life of the composition is greater than 8 hours.

11. The aqueous composition according to claim 1, wherein component c) comprises compounds of elements selected from the group consisting of vanadium, tantalum, molybdenum and tungsten and wherein the pot life of the composition is greater than 8 hours.

12. An adhesive system comprising the aqueous composition according to claim 1.

13. Substrates having the adhesive system according to claim 12 between the substrates.

14. A process for the preparation of the aqueous composition according to claim 1, comprising contacting component c) with components a) or b).

15. A method comprising adhering substrates with the adhesive system according to claim 12, wherein said substrates are selected from the group consisting of leather, ethylvinyl acetate, rubber, polyurethane, polyamide and polyether-amide.

16. A method comprising contacting substrates with the adhesive system according to claim 12, wherein said substrates are selected from the group consisting of paper, cardboard, wood, fibreboards and polyvinyl chloride.

* * * * *